Aug. 22, 1967  S. BELFIORE  3,336,737
ROTARY LAWN MOWER BLADE
Filed Oct. 21, 1963
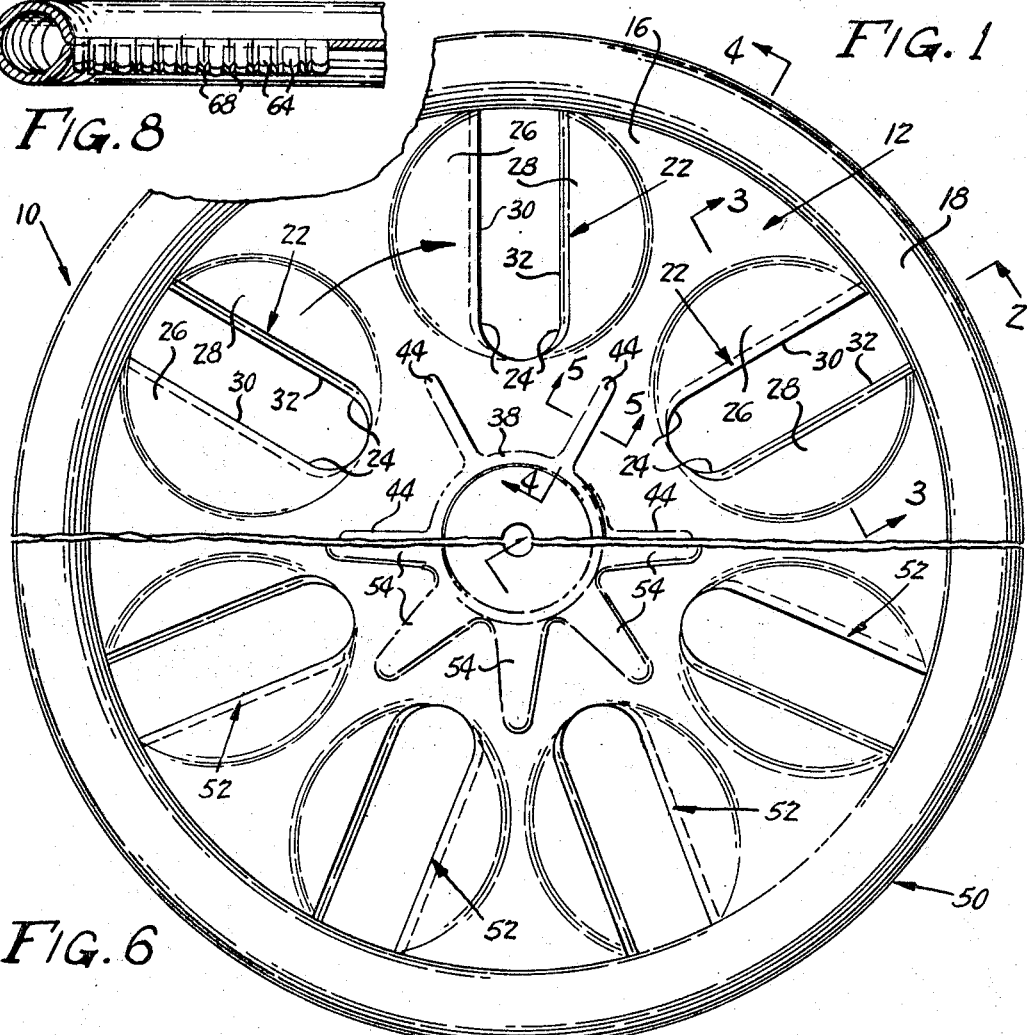
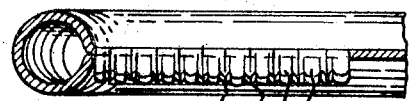
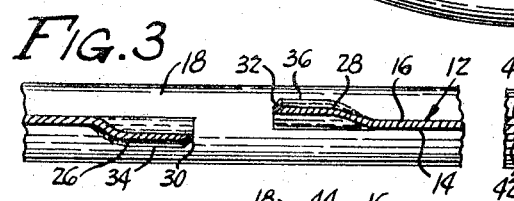
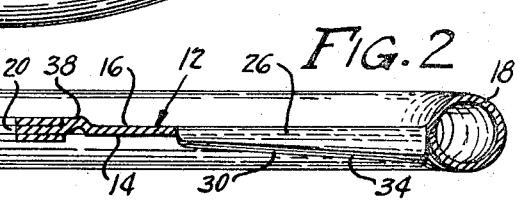
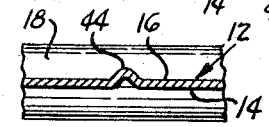
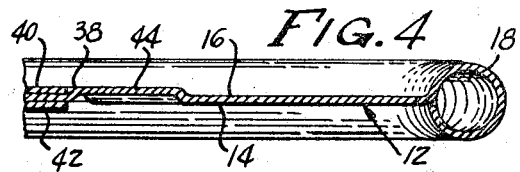
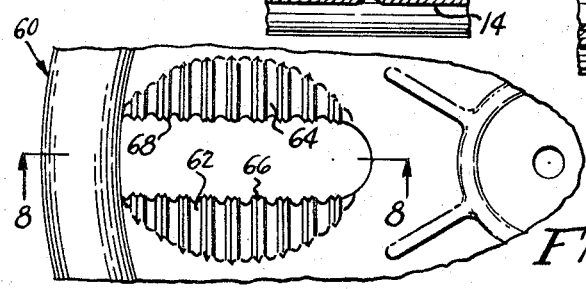
INVENTOR.
SAMUEL BELFIORE
BY
Kimmel & Crowell
ATTORNEYS.

United States Patent Office 3,336,737
Patented Aug. 22, 1967

3,336,737
ROTARY LAWN MOWER BLADE
Samuel Belfiore, Elyria, Ohio, assignor to
Eugene I. Pious, Detroit, Mich.
Filed Oct. 21, 1963, Ser. No. 317,645
10 Claims. (Cl. 56—295)

This invention relates to a lawn mower blade for rotary lawn mowers and more particularly to improvements over the structure shown in my Patent No. 3,097,469.

A primary object of this invention is the provision of a lawn mower blade which is substantially safer in use than blades known heretofore.

Another object of this invention is the provision of a rotary lawn mower blade of the type comprising a disc having grass cutting means defined between its peripheral edge and its geometric center with cutting elements spaced axially from one or both faces of the disc and an enlarged annual bead extending around the periphery of the disc having protective portions spaced axially a greater distance from the face or faces of the disc than the cutting elements to prevent accidental contact of a cutting element with the foot or other body portion of an individual mowing grass.

Yet another object of this invention is to provide a device of the character described, the entire blade being formed from a single sheet of material.

A further object of the instant invention is the provision of a safety rotary lawn mower blade having improved grass cutting means.

A still further object of the instant invention is to provide a reversible safety lawn mower blade which is strong and durable in construction, efficient and safe in operation, and relatively simple and inexpensive to manufacture, utilize, and maintain.

Other and further objects reside in the combination of elements, arrangement of parts, and features of construction.

Still other objects will in part be obvious and in part be pointed out as the description of the invention proceeds and as shown in the accompanying drawing wherein:

FIGURE 1 is a top plan view of approximately one-half of a rotary lawn mower blade in accordance with one embodiment of the instant inventive concept, parts being broken away for illustrative convenience;

FIGURE 2 is a radial cross-sectional view taken substantially on line 2—2 of FIGURE 1;

FIGURE 3 is a fragmentary cross-sectional view through the concaved cups taken substantially on line 3—3 of FIGURE 1;

FIGURE 4 is a radial cross-sectional view through one of the strengthening ribs taken substantially on line 4—4 of FIGURE 1;

FIGURE 5 is a fragmentary transverse cross-sectional view through the strengthening rib taken substantially on line 5—5 of FIGURE 1;

FIGURE 6 is a top plan view similar to FIGURE 1 of approximately one-half of another embodiment of a rotary lawn mower blade in accordance with the instant inventive concept;

FIGURE 7 is a fragmentary top plan view of a portion of a further modified rotary lawn mower blade; and FIGURE 8 is a fragmentary radial cross-sectional view taken substantially on line 8—8 of FIGURE 7.

Similar reference characters refer to similar parts throughout the several views of the drawing.

Referring now to the drawing in general and more particularly to FIGURES 1 to 5, one embodiment of the instant inventive concept is designated generally by the reference numeral 10 and is comprised basically of a disc 12 having oppositely disposed faces 14 and 16, a peripheral edge in the form of an elongated annular bead 18, a substantially central opening 20 for reception of a conventional rotatable shaft of a lawn mower (not shown), and a plurality of grass cutting means 22 intermediate the annular bead 18 and the central opening 20.

The entire blade 10 is preferably stamped from a single piece of material such as sheet metal or the like for ease of manufacture.

The disc 12 is provided with a plurality of substantially radially extending slots 24 and each grass cutting means 22 preferably includes a pair of concave cups 26, 28, formed one on each side of each slot 24 with the cups of each pair being oppositely concaved, one above and one below the disc 12. The edges 30, 32 of each pair of cups 26, 28, respectively, are sharpened (as to a vertex as shown in FIGURE 3) and hardened to define cutting elements spaced axially from the faces 14, 16, of the disc 12 as seen particularly in FIGURES 2 and 3. The edges 30, 32 are preferably inclined centrally toward the faces 14, 16 from the portion adjacent the annular bead 18. Test results have shown this configuration to provide more efficient grass cutting with no drag and better grass removal than the parallel cutting elements in my aforementioned patent.

The peripheral edge of the disc 12 is rolled to form the substantially annular bead 18 which is of such a dimension that it defines protective portions 34 and 36 spaced axially from the faces 14 and 16, respectively, of the disc 12 a greater distance than any portion of the cutting elements 30 and 32. For example, if each of the cutting elements 30 and 32 extend a maximum of one-half inch from their respective disc faces 14 and 16, an outside diameter of 1½ inches for the annular bead 18 has been found to completely protect a bare foot inserted under the rotating blade 10.

A central rim 38 may be stamped or otherwise provided in the disc 12 to facilitate placement of washers 40 and 42 when the blade 10 is mounted on the lawn mower shaft.

Also, a plurality of circumferentially spaced, substantially radially extending strengthening ribs 44 of any desired size and shape may be provided in the disc 12.

The rotary lawn mower disc 50 shown partially in FIGURE 6 is substantially the same as the embodiment 10 of FIGURES 1–5, eight grass cutting means 52 being provided in place of the six grass cutting means 22 of the disc 12 and ten strengthening ribs 54 of a slightly modified construction being substituted for the eight strengthening ribs 44 of the embodiment of FIGURES 1 to 5. This is merely illustrated to indicate that the specific number of grass cutting means and number or construction of strengthening ribs may be varied without departing from the instant inventive concept.

A further modified embodiment is shown in FIGURES 7 and 8 designated generally by the reference numeral 60 and substantially the same as the embodiments of FIGURES 1 to 5 and FIGURE 6 except that the concaved cups 62 and 64 are each fluted for greater strength and the edges thereof defining the cutting elements 66 and 68 are serrated to increase the cutting effectiveness and decrease the tendency towards dullness after extended use. These cutting elements may be inclined as in FIGURES 1–5.

The cancaved cups of each of the embodiments shown taper rearwardly into fluid relation with their respective face of the disc to provide a suction effect which draws the grass to be cut upright into the path of the cutting elements.

It will be understood that in each embodiment of this invention the annular bead is dimensioned to have protective portions extending axially away from the disc faces a greater distance than the cutting elements.

The use and operation of the device of the instant invention will now be apparent and will be described with particular relation to the embodiment of FIGURES 1 to 5, the embodiment of FIGURE 6 and the embodiment of FIGURES 7 and 8 being utilized in a similar manner. The blade 10 is mounted on the rotatable shaft of a conventional rotary lawn mower through the central opening 20, with washers such as 40 and 42 being interposed in a well known manner, and any desired means is utilized to secure the disc 10 to the lawn mower shaft for rotation therewith. The cutting elements 30 will mow the grass which has been drawn upright by the suction effect of the cups 26 and the mower is moved over a lawn or other surface in a conventional manner. The protective portions 34 on the annular bead 18 which extend below the cutting elements 30 will preclude accidental injury to the person using the lawn mower and to children or others in the vicinity of the mower when its blade is rotating. At the same time, the annular bead serves as a protection for the blade 10 and for the lawn mower shaft against high grass, tough weeds, and obstacles such as stones or the like. When the cutting elements 30 eventually become dull, the blade 10 may be removed from the mower shaft and reversed so that the cutting elements 32 will be available for use. Of course, the cutting elements 30 and 32 may be resharpened when necessary. With the construction of the embodiment of FIGURES 7 and 8 an increased shearing action is provided because of the fluted surfaces of the cups 62 and 64 and because of the serrated edges of the cutting elements 66 and 68.

It will now be seen that there is herein provided an improved rotary lawn mower blade which satisfies all of the objectives of the instant invention, and others, including many advantages of great practical utility and commercial importance.

Since many embodiments may be made in the instant inventive concept, and since many modifications may be made in the embodiments hereinbefore shown and described, it is to be understood that all matter herein is to be interpreted merely as illustrative, and not in a limiting sense.

I claim:

1. A rotary lawn mower blade comprising a disc having oppositely disposed faces, a peripheral edge, and means defining a substantially central opening for reception of the rotatable shaft of a lawn mower, grass cutting means defined in said disc intermediate said peripheral edge and said central opening, said grass cutting means including at least one cutting element spaced axially from one of said faces of said disc, and an annular bead extending around at least a portion of said peripheral edge of said disc, said annular bead including protective portions spaced axially a greater distance from said face of said disc than said cutting element.

2. The structure of claim 1 wherein said grass cutting means includes a plurality of individual cutting elements each spaced axially from said face of said disc, said annular bead extending around the entire periphery of said disc.

3. The structure of claim 1 wherein said grass cutting means includes at least one cutting element spaced axially from each of said faces of said disc, said annular bead including protective portions spaced axially a greater distance from each of said faces than said cutting elements.

4. The structure of claim 3 wherein said grass cutting means includes a plurality of individual cutting elements spaced axially from each of said faces of said disc, said annular bead extending around the entire periphery of said disc.

5. The structure of claim 4 wherein said disc includes means defining a plurality of substantially radially extending slots, said grass cutting means including a pair of concaved cups formed one on either side of each slot with the cups of each pair being oppositely concaved, one above and one below said disc, the edges of each cup adjacent said slot defining said cutting elements.

6. The structure of claim 5 wherein said concaved cups each taper rearwardly into fluid relation with said faces of said disc to provide a suction effect.

7. The structure of claim 5 wherein said edges of said cups are serrated.

8. The structure of claim 5 wherein said edges of said cups are each inclined centrally toward said faces of said disc from adjacent said annular bead.

9. In a cutting blade adapted to be rotated in a generally horizontal plane, said cutting blade having a plurality of generally radially extending cutting edges disposed equidistantly about an upright axis of a mower driving shaft adapted to rotate the cutting blade, the improvement of an annular rim concentrically mounted on said cutting blade about said axis, said rim extending continuously around and disposed radially outwardly of the circular path traveled by said edges in revolving about said axis in the cutting operation of the blade, said rim having a lower portion extending downwardly substantially below a common horizontal plane passing through the lowermost portions of said edges to guard the same against radially inward intrusion of objects into said circular path of the said edges, said lower portion of the rim portion being sloped downwardly and radially inwardly in extending from the outer circumferential boundary thereof to the lowermost boundary of said lower portion to provide a camming surface engageable by resistant objects encountered by said rim portion in lateral movement of the cutting blade whereby the rim portion in meeting such a resistant object during such lateral movement is induced to ride up on such a resistant object having a contour and size to be ascended by said camming surface thereby minimizing radially directed impact against the cutting blade by such a resistant object; said rim portion having an upper portion extending upwardly substantially above said common horizontal plane, said upper portion of the rim portion being sloped upwardly and radially outwardly in extending to the uppermost boundary of said upper portion to provide a camming surface engageable to objects centrifugally impelled outwardly of the cutting blade toward said upper portion of the rim portion whereby such objects are angularly deflected upwardly and the velocity of such objects dampened.

10. A rotary cutting blade rotatable in a generally horizontal plane on an upright driving shaft of a mower, comprising the combination of, supporting means mountable on a said shaft and rotatable therewith, a plurality of cutting edge means carried by said support means and revolvable therewith in a circular path about the axis of said shaft to cut vegetation and the like in said path, a plurality of air-deflecting means carried by said support means in juxtaposition to said cutting edge means, respectively, and revolvable therewith to draw air and material cut by said cutting edge means upwardly of said cutting edge means, guard means extending circumferentially of and disposed radially outwardly of said circular path and extending downwardly below a common plane through the lowermost portion of said cutting edge means to guard said cutting edge means against intrusion of resistant objects from outwardly of said guard means to within said circular path, and inclined-wall means extending circumferentially of and disposed radially outwardly of said circular path and extending radially outwardly and upwardly from a plane above said common plane of said cutting edge means and above a common plane through the uppermost portion of said air-deflecting means to meet and deflect upwardly material such as stones and the like centrifugally impelled outwardly by the cutting blade, whereby the velocity of such material is dampened.

References Cited

UNITED STATES PATENTS

| | | | |
|---|---|---|---|
| 1,964,290 | 6/1934 | Krause | 146—124 |
| 2,869,311 | 1/1959 | Beeston | 56—295 |
| 2,920,436 | 1/1960 | Benson | 56—295 |
| 3,059,400 | 10/1962 | Plummer | 56—295 |
| 3,096,608 | 7/1963 | Williamson | 56—295 |
| 3,097,469 | 7/1963 | Belfiore | 56—295 |

ABRAHAM G. STONE, *Primary Examiner.*

ANTONIA F. GUIDA, T. GRAHAM CRAVER,
*Examiners.*

R. J. BAYNHAM, R. R. KINSEY, *Assistant Examiners.*